Aug. 2, 1932.                D. H. REEVES                1,869,617
                         REFRIGERATING APPARATUS
                    Filed Aug. 30, 1930      3 Sheets-Sheet 1

INVENTOR
Donald H. Reeves
BY
Spencer, Hardman and Fehr
ATTORNEY

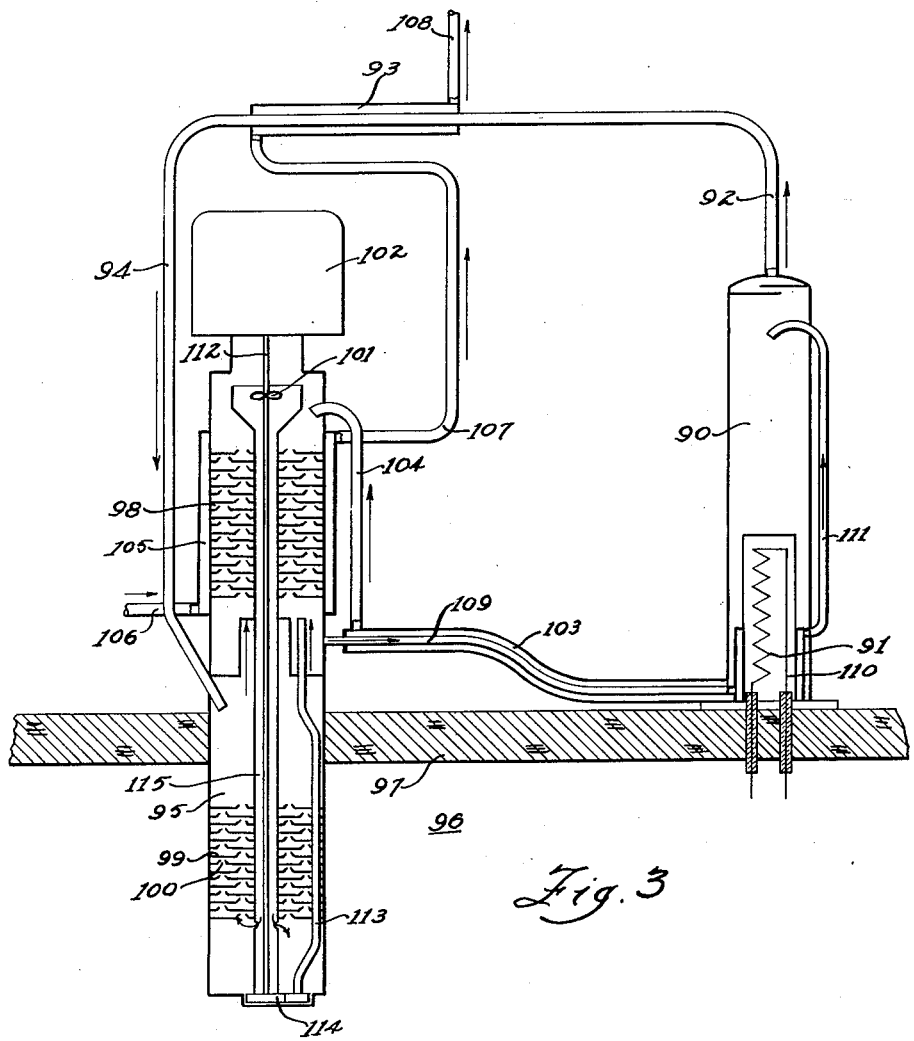

Patented Aug. 2, 1932

1,869,617

UNITED STATES PATENT OFFICE

DONALD H. REEVES, OF DAYTON, OHIO, ASSIGNOR TO FRIGIDAIRE CORPORATION, OF DAYTON, OHIO, A CORPORATION OF DELAWARE

REFRIGERATING APPARATUS

Application filed August 30, 1930. Serial No. 478,919.

This invention relates to refrigerating apparatus and more particularly to continuous absorption machines of the partial pressure type.

Heretofore, in the use of continuous absorption machines of the partial pressure type, that is, absorption machines including a generator, condenser, evaporator, and absorber wherein an inert gas circulates between and through the absorber and evaporator, it has been impossible to locate the evaporator below the absorber. This has been due to the fact that with the evaporator located below the absorber, invariably the liquid absorbent from the generator would eventually collect in the lower evaporator. Yet it is frequently almost compulsory to place the evaporator below the absorber and generator and consequently it is necessary to provide means for returning the liquid absorbent to the absorber or generator. It is to such means, that is, to absorption machines including a generator, condenser, evaporator, and absorber wherein an inert gas circulates between and through the absorber and evaporator and in which the evaporator is placed below the generator and absorber that my invention relates, having for one of its objects means for returning to the generator or absorber from the evaporator, any liquid absorbent collecting therein.

Another object of the invention is to utilize heat for lifting absorption liquid from the bottom of an evaporator located below the generator of an absorption machine of the continuous type.

A further and more specific object of the invention is to provide a fan for circulating the inert gas used in such a system and a pump for removing liquid collecting in the bottom of the evaporator both driven by a single motor.

Further objects and advantages of the present invention will be apparent from the following description, reference being had to the accompanying drawings, wherein a preferred form of embodiment of the present invention is clearly shown.

In the drawings:

Fig. 3 is a diagrammatic illustration of a refrigerating system embodying another modified form of the invention.

Figure 1:
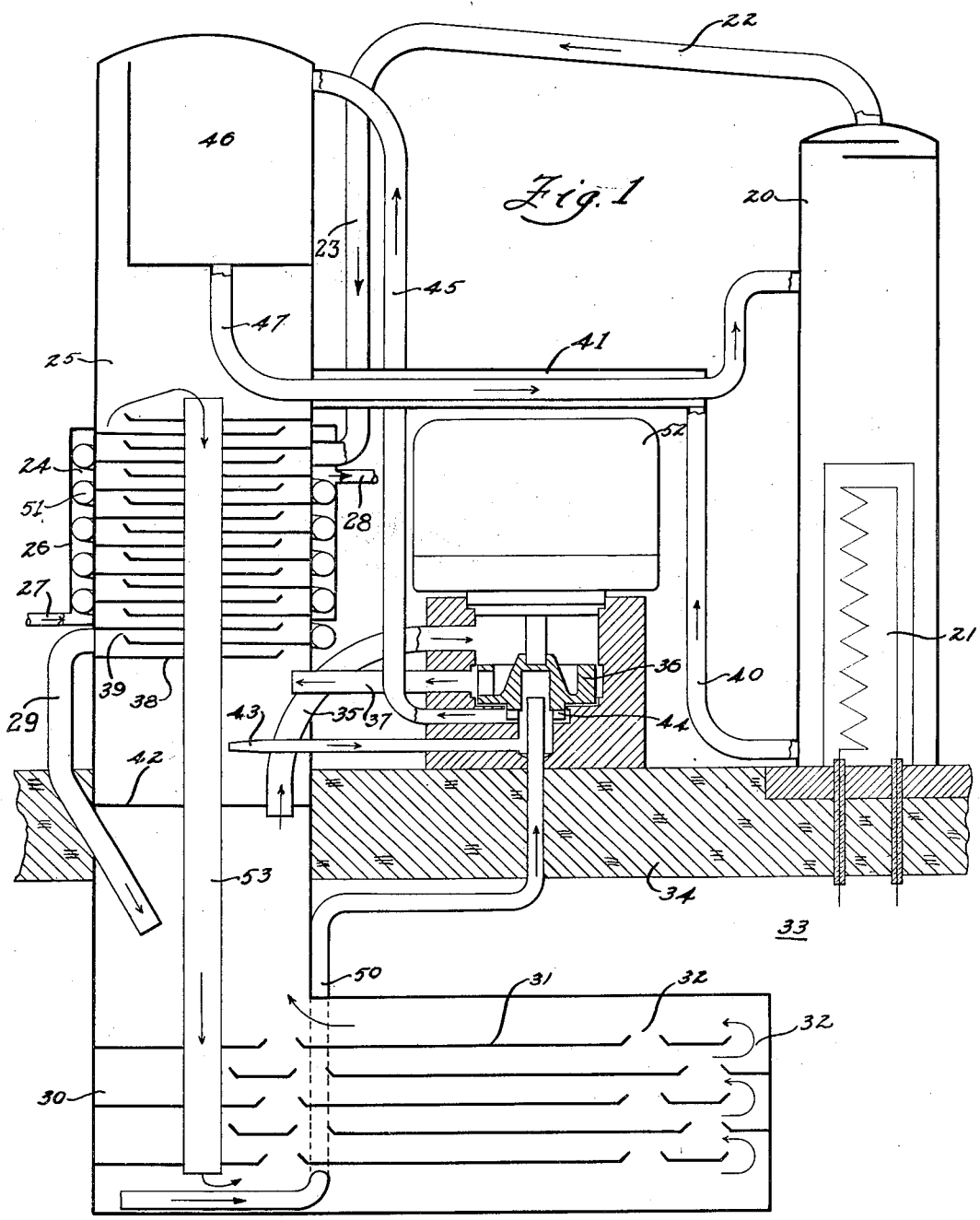
Fig. 1 is a diagrammatic illustration of a refrigerating system embodying the preferred form of the invention.

In the embodiment of the invention shown in Fig. 1, any suitable generator 20 is shown which may be charged with a liquid absorbent, for example aqua ammonia, and heated by any suitable heating device, such as a resistance element 21, to distill ammonia from the solution. The distilled ammonia passes through the rectifier 22, wherein any aqua ammonia is returned by gravity to the generator. The ammonia vapor then passes downwardly through the duct 23 to a condenser 24 which surrounds the absorber 25. The condenser 24 consists of a plurality of coils 51, through which the ammonia vapor passes, and a jacket 26 surrounding the coils. Cooling water is fed to the jacket 26 by the duct 27, and flows upwardly, leaving the jacket through the duct 28.

The ammonia vapor is liquefied in the coils 51 of the condenser 24 and passes downwardly through the conduit 29 into the evaporator 30 situated below the absorber 25.

The evaporator preferably is of the horizontal type and has a number of shallow pans 31 having openings 32 in staggered relation. Liquid ammonia flows through the openings from one pan to the other until all of the pans are filled with a thin layer of liquid.

Inert gas such as air, hydrogen, or carbon dioxide is introduced into the system to substantially equalize the total pressure between the high pressure required for distillation in the generator and the low ammonia pressure required for evaporation in the evaporator 30.

The liquid ammonia collected in the shallow pans of the evaporator vaporizes because of the absorption of heat from the food storage compartment 33 of the refrigerator of which the top wall 34 is shown. This evaporated ammonia diffuses into the inert gas in the evaporator and this mixture is drawn upwardly through the duct 35 to the circulating fan or blower 36 driven by the motor 52 which is directly connected to it. This vaporized ammonia together with the inert gas is forced by the fan or blower 36 through the duct 37 into the absorber 25.

The absorber contains a plurality of shallow pans 38 having openings 39 in staggered relation somewhat similar to those in the evaporator 30. These shallow pans 38 are supplied with weak absorption liquid from the lower portion of the generator by a duct 40 which connects into the lower portion of the generator and extends upwardly through a heat exchanger 41 into the upper portion of the absorber 25. This liquid flows downwardly in the absorber 25 through the openings 39 until all of the shallow pans 38 are filled with a thin layer of liquid, the overflow of which collects on the bottom 42 which separates the absorber 25 from the evaporator 30. This liquid, descending in a serpentine fashion between the shallow pans 38, absorbs the vaporized ammonia passing upwardly therethrough and becomes strong or rich liquor when collected at the bottom of the absorber. The inert gas, of course, is not absorbed and continues upwardly to the top of the absorber 25 and then flows down the central duct 53 to the bottom of the evaporator.

This rich liquor is removed from the absorber by the duct 43 connected to a liquid pump 44 which forces rich liquor up the duct 45 into a reservoir 46 located in the top of the absorber. The rich liquid collecting in the reservoir 46 flows out through the duct 47, through the heat exchanger 41 where it receives heat from the weak liquor coming through the duct 40 from the generator, and finally passes into the upper portion of the generator 20.

In this embodiment, the evaporator 30 is placed below the top wall 34 of the refrigerator cabinet while the absorber 25 and the generator 20 are placed on top of this wall. Since the rectifier 22 does not perfectly separate the aqua ammonia from the ammonia vapor which is expelled from the generator 20, some of the aqua ammonia will be carried along with the ammonia vapor and will collect on the bottom of the evaporator 30. Heretofore in absorption systems the evaporator has been placed above the absorber so that this aqua ammonia collecting in the bottom of the evaporator will flow by gravity to the absorber and then return to the generator.

According to the present invention, the evaporator 30 is placed below the absorber 25 of generator 20 so that this aqua ammonia, located in the bottom of the evaporator 30, cannot flow by gravity into the absorber and for this reason provision must be made for its return to the generator, since if this were not provided for, in time the generator would be deprived of all its aqua ammonia while the evaporator would become flooded with this aqua ammonia. According to the present invention I have provided the duct 50 having its lower end resting on the bottom of the evaporator 30 and having its upper end connecting into the liquid pump 44 whereby this aqua ammonia is returned to the generator along with the rich liquor through the duct 45, reservoir 46 and the duct 47 to the generator 20. By this means any liquid which will collect in the bottom of the evaporator will be pumped from the bottom of the evaporator to the absorber and generator and is thus prevented from collecting there.

Figure 2:
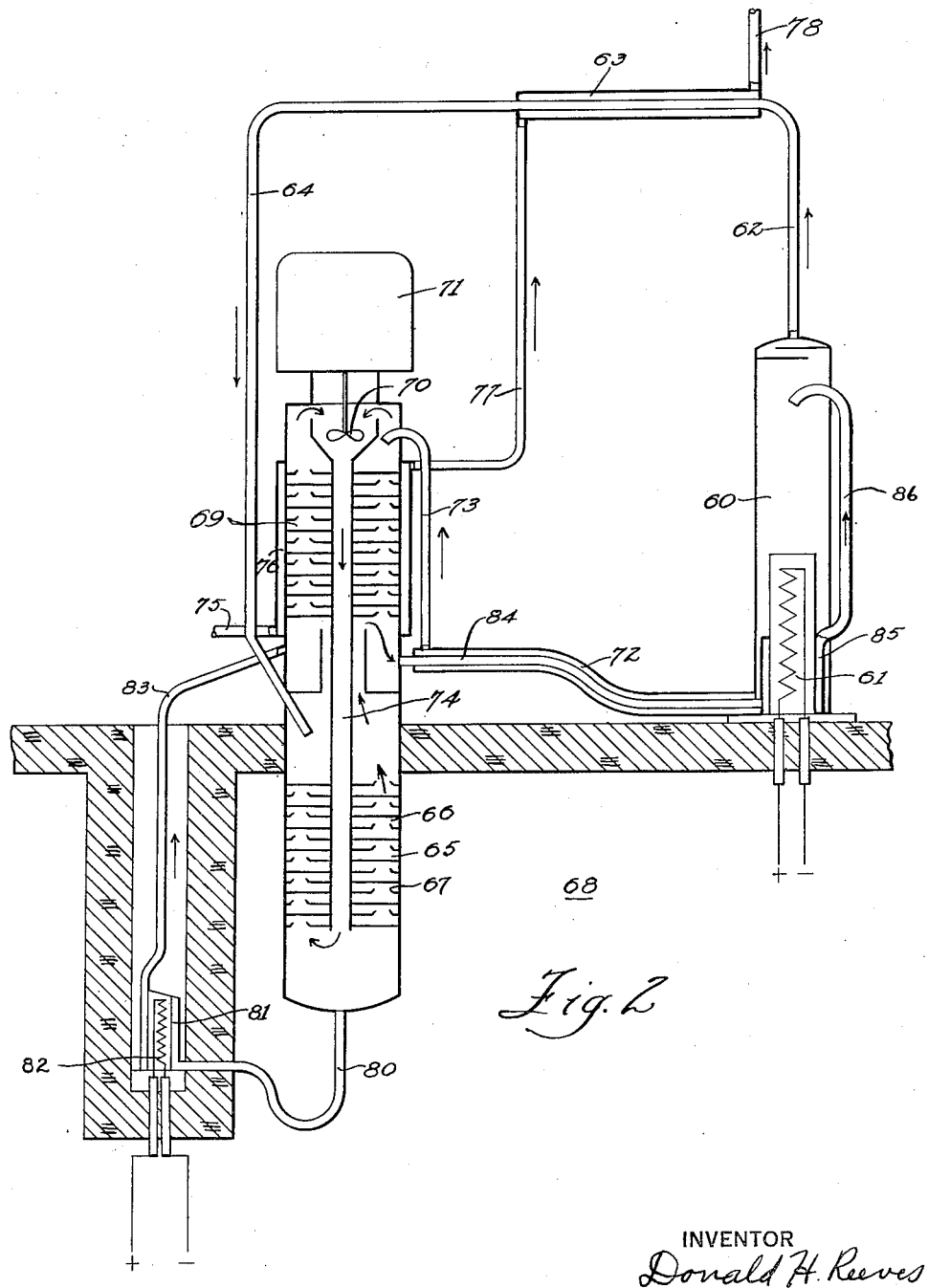
Fig. 2 is a diagrammatic illustration of a refrigerating system embodying a modified form of the invention.

In another embodiment of my invention shown in Fig. 2 the generator 60 is heated by any suitable means or device such as the resistance element 61 to distill ammonia from the aqua ammonia contained within the generator. The distilled ammonia passes through the rectifier 62 which separates the distilled ammonia from the aqua ammonia which returns by gravity to the generator 60. An inert gas such as air, hydrogen, or carbon dioxide is introduced into the evaporator and absorber and substantially equalizes the pressure between the high pressure required for distillation in the generator and the low ammonia pressure required for evaporation in the evaporator. The distilled ammonia vapor is liquefied in the condenser 63 and passes downwardly through the duct 64 into the evaporator 65 which contains a plurality of shallow pans 66, having staggered openings 67 therein. The liquid ammonia flows through the staggered openings 67 from one pan to another until all of the pans are filled with a thin layer of liquid. The liquid ammonia vaporizes because of the absorption of heat from the food storage compartment 68 of the refrigerator, mixes with the inert gas, and this mixture is drawn upwardly into the absorber 69 by the fan 70 located in the top of the absorber and driven by a motor 71 which is directly connected to it.

The absorber 69 contains a plurality of shallow pans with staggered openings therein similar to the shallow pans 66 in the evaporator 65. The weak liquor from the bottom of the generator 60 is conducted to the top of the absorber by the heat exchanger 72 and the duct 73. This weak liquor fills the shallow pans in the manner similar to that in which the liquid ammonia fills the shallow pans 66 in the evaporator 65. The evaporated ammonia, along with the inert gas, is drawn upwardly in a serpentine fashion through the staggered openings in the shallow pans of the absorber 69 where the evaporated ammonia is absorbed by the cold weak liquor in the shallow pans of the absorber 69 while the inert gas is drawn upwardly by the fan 70 and then blown downwardly by this fan through the central duct 74 to the bottom of the evaporator 65. The absorber 69 is cooled by cold water flowing from the duct 75 into the water jacket 76 surrounding the absorber and which passes upwardly through the duct 77 to condenser 63 and is discharged therefrom through the conduit 78.

As in the first described embodiment, provision must be made for removing aqua ammonia which collects little by little in the bottom of the evaporator 65. As shown in this embodiment, a duct 80 conducts this aqua ammonia collected in the bottom of the evaporator 65 to a jacket 81 surrounding a heating element 82 which operates when heated to boil the aqua ammonia causing part of it to vaporize and to pass as vapor up the duct 83 which extends upwardly and connects into the bottom portion of the absorber. This vapor carries the aqua ammonia upwardly along with it into the absorber, the device acting as a vapor lift pump and this removes the aqua ammonia from the bottom of the evaporator and returns it to the absorber. The rich liquor overflowing from the shallow pans in the absorber also collects in the bottom of the absorber and this, together with the aqua ammonia from the evaporator which becomes mixed with it, flows by gravity through the duct 84 within the heat exchanger 72 to a vapor lift device 85 which surrounds the heating element 61 and which has an upwardly extending duct 86 through which the rich liquor is forced up into the generator 60. The heat exchanger 72 transfers the heat from the hot weak liquor coming from the generator to the cold rich liquor flowing into the generator from the absorber.

The embodiment shown in Fig. 3 is somewhat similar to that shown in Fig. 2 and has a generator 90 containing aqua ammonia which is heated by the heating element 91 in the bottom of the generator, the ammonia vapor distilled from the aqua ammonia passing upwardly through the rectifier 92 which separates the aqua ammonia from the ammonia vapor and from which the aqua ammonia will by gravity flow back into the generator while the ammonia vapor passes on to the condenser 93 which cools and liquefies the ammonia vapor. The ammonia then flows downwardly in liquid form through the duct 94 to the evaporator 95 which is located within the food storage compartment 96 of the refrigerator and below the top wall 97 of the refrigerator cabinet while the absorber 98 and the generator 90 are located on top of this wall 97.

The evaporator 95 is provided with a plurality of shallow pans 99 having staggered openings 100 therein so that the liquid ammonia flows through the openings from one shallow pan to another until all of the shallow pans are filled with a thin layer of liquid. Inert gas such as hydrogen, air or carbon dioxide is introduced into the absorber and evaporator to substantially equalize the total pressure required for distillation in the generator from the total pressure required for evaporation in the evaporator. The liquid ammonia contained in the shallow pans 99 of the evaporator vaporizes because of the absorption of heat from the food storage compartment 96 of the refrigerator, diffuses into the inert gas, and this mixture is drawn upwardly along with the inert gas into the absorber by the fan 101 which is driven by the motor 102, which is directly connected to it.

The absorber 98, which is located above the evaporator 95, contains a plurality of shallow pans having staggered openings therein similar to the shallow pans 99 and the staggered openings 100 in the evaporator 95. The shallow pans in the absorber 98 are kept filled with weak liquor which flows from the bottom of the generator 90 through a heat exchanger 103 and up the conduit 104 to the top of the absorber because of a slight difference in level between the generator 90 and the absorber 98. The absorber is cooled by a water jacket 105 through which cooling water flows which enters the jacket by the duct 106 and leaves the jacket through the duct 107 which extends upwardly and which is connected to the condenser 93 at its upper end. The cooling water is discharged through the duct 108.

The mixture of ammonia vapor and inert gas passes upwardly through the staggered openings between the shallow pans of the absorber 98, where the ammonia vapor is absorbed by the cold weak liquor which is contained in these pans while the now liberated inert gas is drawn up to the top of the absorber and blown down the central duct 115 to the bottom of the evaporator. The cold weak liquor flows downwardly and through the progressive absorption of the ammonia vapor, becomes rich liquor by the time it collects in the bottom of the absorber. This rich liquor is withdrawn from the bottom of the absorber through a duct 109 which passes through the heat exchanger 103 where heat present in the weak liquor coming from the bottom of the generator 90 is transferred to the rich liquor coming from the absorber through duct 109. The duct 109 connects into a vapor lift device comprising a jacket 110 surrounding the heating element 101 and a duct 111 which extends upwardly into the interior of the generator 90. This vapor lift device overcomes the slight differential pressure between the generator and the absorber and forces the rich liquor back into the generator.

In accordance with the present invention, means are provided for returning the aqua ammonia which collects in the bottom of the evaporator as explained in connection with the first described embodiment. In this embodiment, the shaft 112, which drives the fan 101 for circulating the inert gas through the evaporator 95 and the absorber 98 is extended downwardly to the bottom of the evaporator where it is connected to a pump 114 which is situated in the bottom of the evaporator and which pumps the aqua ammonia collecting there upwardly through the duct 113 into the bottom of the absorber 98 where this aqua ammonia mixes with the rich liquor and is returned to the generator through the duct 84.

Thus a refrigerating system of the continuous absorption partial pressure type, having the evaporator situated below the absorber and the generator has been shown having means for returning to the absorber, and finally to the generator the aqua ammonia which collects in the bottom of the evaporator because of the failure of the rectifier to separate all the aqua ammonia from the ammonia vapor expelled from the generator.

While the form of embodiment of the present invention as herein disclosed, constitutes a preferred form, it is to be understood that other forms might be adopted, all coming within the scope of the claims which follow.

What is claimed is as follows:

1. Refrigerating apparatus of the continuous absorption type including a generator, an absorber containing absorption liquid, a condenser, and an evaporator connected to form a closed system, said evaporator being positioned below the generator and absorber, said evaporator and absorber containing an inert gas, and common means for circulating said inert gas and for returning absorption liquid collecting in the evaporator to the absorber.

2. Refrigerating apparatus of the continuous absorption type including a generator, an absorber containing absorption liquid, a condenser and an evaporator connected to form a closed system, said evaporator being positioned below the generator and absorber, said evaporator and absorber containing inert gas, a reservoir positioned above the absorber and generator and means for pumping absorption liquid from the evaporator into the reservoir.

3. Refrigerating apparatus of the continuous absorption type including a generator, an absorber containing absorption liquid, a condenser and an evaporator connected to form a closed system, said evaporator being positioned below the generator and absorber, said evaporator and absorber containing inert gas, a reservoir positioned above the absorber and generator and means for pumping absorption liquid from both the absorber and evaporator to said reservoir.

4. Refrigerating apparatus of the continuous absorption type including a generator, a condenser, an absorber containing absorption liquid and an inert gas, and an evaporator connected together to form a closed system, said evaporator being positioned below the generator, and a single source of power operating means for returning absorption liquid collecting in the bottom of the evaporator and for circulating inert gas.

5. Refrigerating apparatus of the continuous absorption type including a generator, an absorber containing absorption liquid and an inert gas, a condenser, and an evaporator connected to form a closed system, said evaporator being positioned below the generator, and a single motor driving a fan for circulating the inert gas through the absorber and evaporator and a pump for pumping absorption liquid from the evaporator to the absorber.

6. Refrigerating apparatus of the continuous absorption type including a generator, a condenser, an absorber containing absorption liquid and an inert gas, and an evaporator connected to form a closed system, said evaporator being positioned below the generator, and a pump having one portion for circulating the inert gas through the absorber and evaporator and another portion for pumping absorption liquid collecting in the bottom of the evaporator and the absorption liquid in the bottom of the absorber into the generator.

In testimony whereof I hereto affix my signature.

DONALD H. REEVES.